United States Patent [19]

Iwasa et al.

[11] 4,095,579
[45] Jun. 20, 1978

[54] ENGINE BALANCER DRIVING MECHANISM

[75] Inventors: Seizo Iwasa, Kyoto; Kazuo Onoue, Kameoka, both of Japan

[73] Assignee: Mitsubishi Jidosha Kogyo Kabushiki Kaisha, Tokyo, Japan

[21] Appl. No.: 645,102

[22] Filed: Dec. 29, 1975

[30] Foreign Application Priority Data

Dec. 26, 1974 Japan .................................. 49-3582

[51] Int. Cl.² ........................ F02B 75/06; F16H 7/00
[52] U.S. Cl. .................................. 123/192 B; 74/603; 74/604; 74/221; 74/226
[58] Field of Search ................. 74/603, 604, 221, 226; 123/192 B

[56] References Cited

U.S. PATENT DOCUMENTS

| | | | |
|---|---|---|---|
| 2,214,921 | 9/1940 | Criwell | 74/604 X |
| 2,632,340 | 3/1953 | Dolza et al. | 74/603 |
| 2,838,957 | 6/1958 | Johnson | 74/604 |
| 2,914,963 | 12/1959 | Scherenberg | 74/604 |
| 3,110,195 | 11/1963 | Hanley | 74/604 |
| 3,830,212 | 8/1974 | Seino et al. | 74/603 X |
| 3,995,610 | 12/1976 | Nakamura et al. | 74/604 X |
| 4,000,666 | 1/1977 | Ito et al. | 74/604 |
| 4,031,761 | 6/1977 | Fisher et al. | 74/221 X |

FOREIGN PATENT DOCUMENTS

| | | | |
|---|---|---|---|
| 2,288,221 | 5/1976 | France | 123/192 B |
| 1,188,365 | 3/1965 | Germany | 74/603 |
| 674,225 | 6/1952 | United Kingdom | 123/192 B |

*Primary Examiner*—Samuel Scott
*Assistant Examiner*—Carl F. Pietruszka
*Attorney, Agent, or Firm*—Sughrue, Rothwell, Mion, Zinn and Macpeak

[57] ABSTRACT

An engine balancer driving arrangement is disclosed having a plurality of sprockets or belt pulleys mounted, respectively, on a driving shaft of an oil pump or the like, on the crankshaft, and on the shafts of said balancers and a single endless timing chain or corrugated belt engaged with all of said sprockets or belt pulleys. The two sprockets or belt pulleys, which are mounted on the balancer shafts, are brought into engagement with the inner and outer periphery of said timing chain, respectively. The oil pump or other auxiliary mechanism is disposed within a dead space which is formed by the cam shaft driving mechanism between the front wall of the engine and said balancer driving mechanism thereby reducing the overall length of the engine.

13 Claims, 2 Drawing Figures

ENGINE BALANCER DRIVING MECHANISM

RELATED APPLICATIONS

This application is directed to an improvement of the invention described in U.S. application Ser. No. 527,780, now U.S. Pat. No. 3,995,610, by Nakamura et al, filed Nov. 27, 1974, and entitled "Four Cylinder In-Line Engine with Secondary Balancer System" (corresponds to Japanese patent application Nos. 133,873/73 and 38,665/74; attorney docket Q 2001).

BACKGROUND OF THE INVENTION

1. Field of the Invention

The present invention relates to improvements in an engine balancer driving arrangement.

2. Description of the Prior Art

In a conventional in line four-cylinder engine, a variety of devices have been proposed for preventing vibration of the engine by dissipating the secondary vertical vibromotive forces of the engine. However, such devices cannot eliminate the secondary vibromotive moment due to the reciptocating mass nor due to the explosion torque.

As is well known in the art, a balancer driving mechanism is disposed in front of an existing engine separately from the driving mechanism which operates an auxiliary mechanism, such as a water pump, a cooling fan, an oil lamp or a dynamo. Since the balancer driving mechanism is arranged in the direction of the engine crank-shaft, the overall length of the engine is inevitably made larger. Since, moreover, the foregoing mechanisms are arranged together in a remarkably small space, the assembly and repair thereof becomes quite complicated.

The latter problem is especially prominent when it becomes necessary to use a reversing mechanism for reversing one of the paired balancer shafts. The use of a reversing mechanism will render the overall construction of the balancer driving mechanism more complicated and will result in higher costs.

SUMMARY OF THE INVENTION

The present invention eliminates the foregoing various drawbacks and provides a balancer driving mechanism including at least one pair of balancers disposed on opposite sides of and substantially parallel with the engine crank axis. The pair of balancers are rotated in opposite directions relative to each other at twice the RPM's of the crank-shaft. The engine balancer driving arrangement comprises generally a plurality of sprockets (or belt pulleys) mounted respectively on a drive shaft of at least one auxiliary mechanism, such as an oil pump, a crank-shaft, and on the shafts of said balancers. A single endless timing chain (or belt which is formed with corrugations on its inner and outer peripheries) engages with all of said sprockets (or belt pulleys). The sprocket (or belt pulley), which is mounted on one of the balancer shafts, is brought into engagement with the inner periphery of the timing chain (or belt), whereas the sprocket (or belt pulley), which is mounted on the other of the balancer shafts, is brought into engagement with the outer periphery of the timing chain (belt).

DETAILED DESCRIPTION OF THE PREFERRED EMBODIMENT

Figure 2:
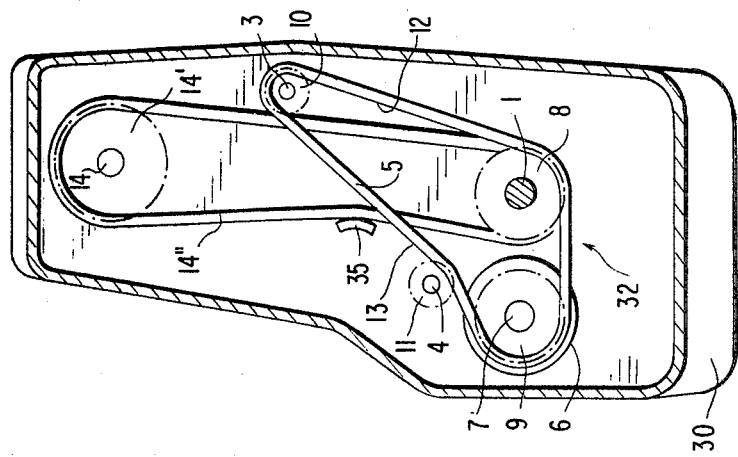
FIG. 2 is a side elevation viewed along line II—II of FIG. 1.
Figure 1:
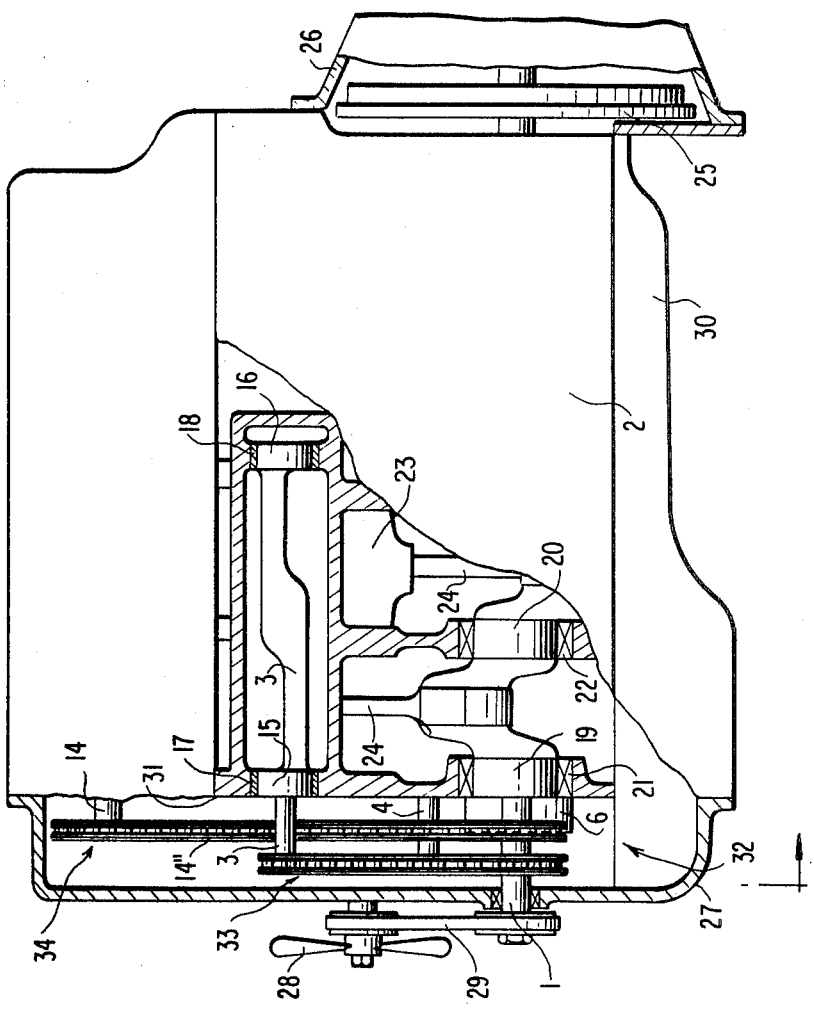
FIG. 1 is an explanatory view showing, in partially cut-away section, one embodiment of the present invention.

As indicated in FIGS. 1 and 2, reference numeral 1 is a crank-shaft, which is mounted in a cylinder block 2, and numerals 3 and 4 represent at least one pair of balancer shafts which are disposed on opposite sides of and substantially parallel with the crank axis. The balancer shafts 3 and 4 are rotated in the opposite directions relative to each other at ($2\omega$) twice the rotational rate of the crank-shaft 1. A single endless chain 5 is engaged with sprockets 8, 9, 10 and 11, which are mounted, respectively, on the crank-shaft 1, a driving shaft 7 of an oil pump 6, the balancer shafts 3, and the balancer shaft 4. The sprocket 10, which is mounted on the balancer shaft 3, is engaged with the inner periphery 12 of the chain 5, whereas sprocket 11 of balancer shaft 4 is engaged with the outer periphery 13 of the chain 5. A cam shaft 14 has its sprocket 14' driven by the crank-shaft 1 through a chain 14". Journal portions of the balancer shaft 3 are shown at 15 and 16, which are pivotally supported, respectively, by bearings 17 and 18 in the cylinder block 2. Similarly, journal portions of the crank-shaft 1 are designated at 19 and 20 and are pivotally supported by bearings 21 and 22. A piston 23, pivotally attached to a restricted end portion of a connecting rod, is in turn pivotally connected to the crank-shaft 1. A fly wheel 25 is mounted on the rear end of crank-shaft 1. A bell housing 26 and timing gear case 27 are mounted on the cylinder block 2 at the respective ends thereof and a cooling fan 28 is actuated by a belt driving mechanism 29 of the crank-shaft 1. Reference numeral 30 indicates an oil pan. As shown in FIG. 1 the cam shaft driving mechanism 34 is disposed in the space 32 between the front wall 31 of cylinder block 2 and balancer driving mechanism 33. The portion of the space not occupied by chain 14" is dead space. The oil pump 6 is disposed within the dead space 32. Reference numeral 35 indicates a tension applying member for the timing chain 5.

According to the embodiment of the present invention herebefore described, the two balancer shafts 3 and 4 can be rotated by the single chain in directions opposite to each other without requiring any special reversing mechanism. Thus, the balancer driving mechanism can not only be manufactured at a reduced cost but also can be so simplified as to reduce malfunctions and can easily be repaired. Since, moreover, the oil pump can be accommodated in the dead space 32 in the front wall of the engine, the overall length of the engine can be materially shortened.

Although the description of the foregoing embodiment has been limited to the case where the driving system is of the sprocket-chain type, it should be noted that the present invention can employ an endless timing belt and that the present invention can be applied to a horizontal engine. It should be appreciated that effects similar to those of the above embodiment will result if the chain is engaged with a driving shaft of another auxiliary mechanism, such as a dynamo, instead of the driving shaft of the oil pump.

What is claimed is:

1. A four cylinder in-line engine comprising a front wall, a crank-shaft, at least one auxiliary mechanism, a balancer driving mechanism of the type which includes at least one pair of balancer shafts disposed at desired spacings on the opposite sides of the plane including longitudinal axes of said cylinders and substantially in parallel with said crank-shaft axis, said balancer shafts being rotated in the opposite directions to each other at twice the rotational rate of the crank-shaft of the engine, and one of said balancer shafts which is disposed at the lower side of said longitudinal cylinder axes being rotated in the opposite direction to the crank-shaft, a plurality of rotating means mounted, respectively, on a driving shaft of said auxiliary mechanism, on said crank-shaft, and on the balancer shafts, and endless drive means engaging all of said rotating means, and wherein said rotating means mounted on one of the balancer shafts is in engagement with the inner periphery of said endless drive means, and said rotating means mounted on the other of said balancer shafts, is in engagement with the outer periphery of said endless drive means, said engine further comprising a cam-shaft, a rotating means mounted on said cam-shaft and a cam-shaft driving mechanism, said cam-shaft driving mechanism being driven by said crank-shaft and being located in a space between the front wall of the engine and said balancer driving mechanism, said cam-shaft driving mechanism and the front wall of said engine defining a dead space therebetween and said auxiliary mechanism of said engine being located in said dead space.

2. The apparatus of claim 1 wherein said auxiliary mechanism is an oil pump.

* * * * *